: US 9,077,110 B2
: Jul. 7, 2015

(12) United States Patent
Ohmura

(54) ARC DISCHARGE PREVENTION CONNECTOR

(75) Inventor: Takenori Ohmura, Kakegawa (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/113,232

(22) PCT Filed: May 18, 2012

(86) PCT No.: PCT/JP2012/063414
§ 371 (c)(1),
(2), (4) Date: Oct. 22, 2013

(87) PCT Pub. No.: WO2012/161295
PCT Pub. Date: Nov. 29, 2012

(65) Prior Publication Data
US 2014/0045362 A1    Feb. 13, 2014

(30) Foreign Application Priority Data

May 20, 2011  (JP) .................. 2011-113931

(51) Int. Cl.
H01R 13/629    (2006.01)
H01R 13/639    (2006.01)
H01R 13/627    (2006.01)
(Continued)

(52) U.S. Cl.
CPC ............. *H01R 13/639* (2013.01); *H01R 13/53* (2013.01); *H01R 13/6275* (2013.01); *H01R 13/707* (2013.01); *B60L 11/1818* (2013.01); *B60L 2270/32* (2013.01); *B60L 2270/34* (2013.01); *Y02T 10/7005* (2013.01); *Y02T 90/14* (2013.01)

(58) Field of Classification Search
CPC .......... H01R 13/62933; H01R 13/629; H01R 13/639
USPC .................................. 439/310, 372
See application file for complete search history.

(56) References Cited

U.S. PATENT DOCUMENTS 5,417,579 A    5/1995  Yoshioka et al.
5,545,049 A    8/1996  Hasegawa et al.
(Continued)

FOREIGN PATENT DOCUMENTS

CN    1146081 A    3/1997
CN    102017320 A    4/2011
(Continued)

OTHER PUBLICATIONS

International Search Report (PCT/ISA/210), dated Aug. 30, 2012, issued by the International Search Report in counterpart International Patent Application No. PCT/JP2012/063414.
(Continued)

*Primary Examiner* — Gary Paumen
(74) *Attorney, Agent, or Firm* — Sughrue Mion, PLLC

(57) ABSTRACT

An arc discharge prevention connector includes a cylindrical case, a connector body, a lever, a handle and a release lever. The release lever has an action arm, a provisional latch arm provided on the action arm, and a complete latch arm provided on the provisional latch arm. A provisional latch piece and a complete latch piece are provided on the handle or the connector body. In a state that the provisional latch arm is engaged with the provisional latch piece, the power terminal is in contact with a power terminal of the mating connector and the signal terminal is in non-contact with a signal terminal of the mating connector.

6 Claims, 4 Drawing Sheets

(51) Int. Cl.
*H01R 13/707* (2006.01)
*B60L 11/18* (2006.01)
*H01R 13/53* (2006.01)

(56) References Cited

U.S. PATENT DOCUMENTS

| | | | |
|---|---|---|---|
| 5,558,533 | A | 9/1996 | Hashizawa et al. |
| 5,573,417 | A | 11/1996 | Hashizawa et al. |
| 5,639,256 | A | 6/1997 | Endo et al. |
| 5,674,086 | A | 10/1997 | Hashizawa et al. |
| 5,769,650 | A | 6/1998 | Aoyama et al. |
| 6,225,153 | B1 | 5/2001 | Neblett et al. |
| 6,494,729 | B1 * | 12/2002 | Stathopoulos et al. ........ 439/160 |
| 2011/0034053 | A1 | 2/2011 | Matsumoto et al. |
| 2011/0171850 | A1 * | 7/2011 | Brown, II ...................... 439/372 |
| 2012/0045923 | A1 | 2/2012 | Ohmura |

FOREIGN PATENT DOCUMENTS

| | | |
|---|---|---|
| DE | 43 43 210 A1 | 7/1994 |
| DE | 44 32 194 A1 | 4/1995 |
| DE | 44 46 853 A1 | 8/1995 |
| JP | 6343203 A | 12/1994 |
| JP | 7-85926 A | 3/1995 |
| JP | 2921640 B2 | 4/1999 |
| WO | 2010015641 A1 | 2/2010 |
| WO | 2010/143750 A1 | 12/2010 |

OTHER PUBLICATIONS

Written Opinion (PCT/ISA/237), dated Aug. 30, 2012, issued by the International Search Report in counterpart International Patent Application No. PCT/JP2012/063414.

Office Action dated Dec. 9, 2014, issued by the Japanese Intellectual Property Office in counterpart Japanese Application No. 2011-113931.

Office Action issued May 6, 2015, in corresponding Chinese patent application No. 201280024570.3.

* cited by examiner

ARC DISCHARGE PREVENTION CONNECTOR

TECHNICAL FIELD

The present invention relates to a power supply connector to be used for charging of, for example, an electric automobile, and also relates to an arc discharge prevention connector which allows a fitting operation between power supply side and power reception side connectors to be carried out by a low insertion force and is capable of preventing arc discharge even in a case where male and female power terminals are separated from each other under a condition that the male and female power terminals are in contact with each other in a half fitted state.

BACKGROUND ART

A power supply side connector having a low insertion force which is to be fitted with a power reception side connector fixed to a vehicle body of an automobile and is provided with a lever, is publicly known (see, e.g., Patent Literature 1 (PTL 1)).
[Configuration of Power Supply Connector Described in PTL 1]

FIG. 4 is a vertical cross sectional view showing a power supply connector described in PTL 1.

As shown in FIG. 4, a power supply side connector 100 includes a cylindrical case 100C, a connector body 100M which is slidably attached to a front half part of the cylindrical case 100C, is moved forward against a repulsive force of a coil spring when a rear end thereof is pushed by a handle 100H and accommodates a plurality of terminals therein, the handle 100H which is pivotally supported by a pin 100P2 inserted into a long cave hole at a rear half part of the cylindrical case 100C, a lever 100L of which the intermediate portion is pivotally attached in the cylindrical case 100C by a lever shaft 100P1 and of which the tip portion is pivotally supported by the pin 100P2 inserted into a shaft hole of the handle 100H and the long cave hole of the cylindrical case 100C, and a release lever 101 which blocks rotation of the lever 100L under a condition that the connector 100M and a mating connector are fitted with each other. When the lever 100L is gripped up toward the handle 100H side, a tip portion of the lever 100L at an active side is rotated in a counterclockwise direction centering around the lever shaft 100P1 so as to cause the connector body 100M to advance in a direction of the mating connector so that the connector 100 is fitted with the mating connector. When the fitting is completed, a latch projection portion 101K formed at a tip portion of the release lever 101L is engaged with a latch step portion 100K formed at a tip portion of an action portion on the lever 100L so that the lever 100L is locked by the release lever 101.

CITATION LIST

Patent Literature

[PTL 1] JP-A-7-85926
[Problems of Power Supply Connector Described in PTL 1]

The power supply connector 100 is constituted such that in a case where an operation of fitting the power supply connector 100 is carried out, the fitting can be usually achieved when the lever 100L is gripped up. However, while the lever 100L is gripped and the operation of fitting with a mating connector 200 is carried out, interference abrasion possibly occurs between both of connector housings. It is, for example, interference abrasion between a connector housing 100C1 and a connector housing 200C1 at a counter side shown in FIG. 4 or between a connector housing 100C2 and a connector housing 200C2 at a counter side shown in FIG. 4. When such interference abrasion occurs, the lever 100L is stopped under a condition that the lever 100L is not yet gripped up. When the lever 100L is gripped up, the latch projection portion 101K at the tip portion of the release lever 101 becomes in an engaged state with the latch step portion 100K of the lever 100L, and thereby the lever 100L is locked. However, when the lever 100L is stopped under a condition that the lever 100L is not yet gripped up, the latch projection portion 101K at the tip portion of the release lever 101 becomes in a half engaged state with the latch step portion 100K of the lever 100L so that the lever 100L is not locked as shown in the enlarged part (1) in FIG. 4. On the other hand, since a terminal 100T of the connector and a terminal 200T of the mating connector are in a mutually connected state, charging is started. Therefore, when an impact is applied, the latch projection portion 101K at the tip portion of the release lever 101 and the latch step portion 100K of the lever 100L are released from the half engaged state, and the lever 100L is possibly restored to its original position. With this, since the terminal 100T of the connector and the terminal 200T of the mating connector may be released from a charging state, arc discharge possibly occurs between the terminals in the event of releasing so that the terminals are possibly damaged.

SUMMARY OF INVENTION

Technical Problem

The arc discharge occurs when power terminals are separated from each other while the power terminals are still in energizing states (when signal terminals are first separated from each other, but before a control section shuts down the energizing). When the connectors are suddenly disconnected in the event of unexpected disconnection due to a reactive force of the lever, there is not an enough time from the separation between the signal terminals to the separation between the power terminals so that the arc discharge may occur in that interval.

The invention is made in view of the above points, and the purpose of the invention is to provide an arc discharge prevention connector that prevents arc discharge from occurring on power terminals even in a case where interference abrasion occurs between connector housings during an operation of fitting with a mating connector so as to cause the connectors to be stopped in a half fitted state in which a lever is not yet gripped up, and after that the power terminals are disconnected from each other.

Solution to Problem

In order to achieve the above purpose, the invention having aspects (1) to (3) relates to an arc discharge prevention connector and has the following features.

(1) An arc discharge prevention connector includes a cylindrical case, a connector body that is slidably accommodated in a front half part of the cylindrical case and has a power terminal and a signal terminal, a lever rotatably attached to the cylindrical case, a handle, and a release lever that prevents a returning operation of the lever in a state that the connector body is fitted with a mating connector by a rotational operation of the lever. The connector body is moved in the cylindrical case in accordance with the rotational operation of the lever. The release lever has an action arm extending in an axial direction of the connector body, a provisional latch arm provided on a tip portion of the action arm, and a complete latch arm provided on a tip portion of the provisional latch arm. A provisional latch piece which is engaged with the provisional latch arm at a half fitted position of the connector body and a complete latch piece which is engaged with the complete latch arm at a completely fitted position of the connector body are provided on either one of the handle and the connector body. In a state that the provisional latch arm is engaged with the provisional latch piece, the power terminal is in contact with a power terminal of the mating connector and the signal terminal is in non-contact with a signal terminal of the mating connector.

(2) For example, the provisional latch arm is rotatably provided on the tip portion of the action arm via a pin therebetween, the complete latch arm is rotatably provided on the tip portion of the provisional latch arm via a pin therebetween.

(3) For example, dimensions of the power terminal and the signal terminal are set to be differentiated so that the power terminal is brought into contact with the power terminal of the mating connector prior to a timing the signal terminal is brought into contact with the signal terminal of the mating connector.

Advantageous Effects of Invention

In accordance with the above aspect (1) of the invention, even in a case where an impact is applied under a condition that the incomplete engagement is made on a completely latched position and the incomplete engaged state is released, the handle or the connector body is moved backward from the completely latched position to be locked on the provisional latching position nearest to the completely latched position. While the signal terminal is disconnected on the provisional latching position, the power terminal is still in a contact state so that arc discharge does not occur. Therefore, when a charge circuit stops energizing to the power terminal by detecting disconnection of the signal terminal under the above condition, safe detaching or refitting can be carried out.

In accordance with the above aspect (2) of the invention, since the provisional latch arm is rotatably provided on the tip portion of the action arm with the pin therebetween and the complete latch arm is rotatably provided on the tip portion of the provisional latch arm with the pin therebetween, it is possible to ensure rotational movement of the provisional latch arm and the complete latch arm.

In accordance with the above aspect (3) of the invention, since the dimensions are set to be differentiated such that the power terminal is brought into contact with that of the mating connector earlier than when the signal terminal is, it is possible to readily adjust fitting timings of the power terminal and the signal terminal.

BRIEF DESCRIPTION OF DRAWINGS

FIG. 3F is a schematic view showing an incomplete engaged state, while

DESCRIPTION OF EMBODIMENTS

[Arc Discharge Prevention Connector According to the Present Disclosure]

Figure 1A:
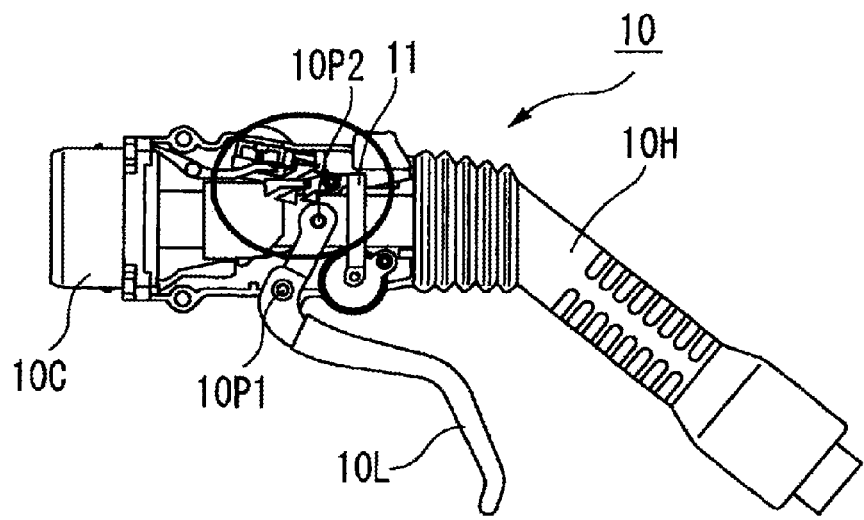
FIG. 1A is an elevational view showing a non-fitted (an initial) state of an arc discharge prevention connector according to the invention.

Next, an arc discharge prevention connector according to the invention is described with reference to accompanying drawings. In FIGS. 1 and 2, an arc discharge prevention connector 10 is a power supply side connector to be fitted with a power reception side connector of a battery mounted on an automobile. The arc discharge prevention connector 10 is configured to have a cylindrical case 10C, a connector body 10M (shown in FIG. 2A), a lever 10L, a handle 10H and a release lever 11. The cylindrical case 10C, connector body 10M, lever 10L, handle 10H and release lever 11 are described below.

[Cylindrical Case 10C]

In the cylindrical case 10C, the connector body 10M (see FIG. 2A) is slidably accommodated in its front half part, the handle 10H is pivotally supported by a pin 10P2 inserted into a long cave hole at its rear half part, and an intermediate portion of the lever 10L is pivotally attached thereto by a lever shaft 10P1.

[Connector Body 10M]

Figure 2A:
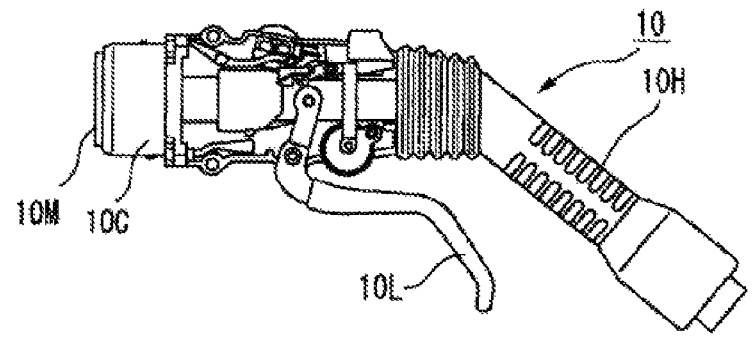
FIG. 2A is an elevational view showing a provisional fitted state of the arc discharge prevention connector according to the invention.
Figure 2B:
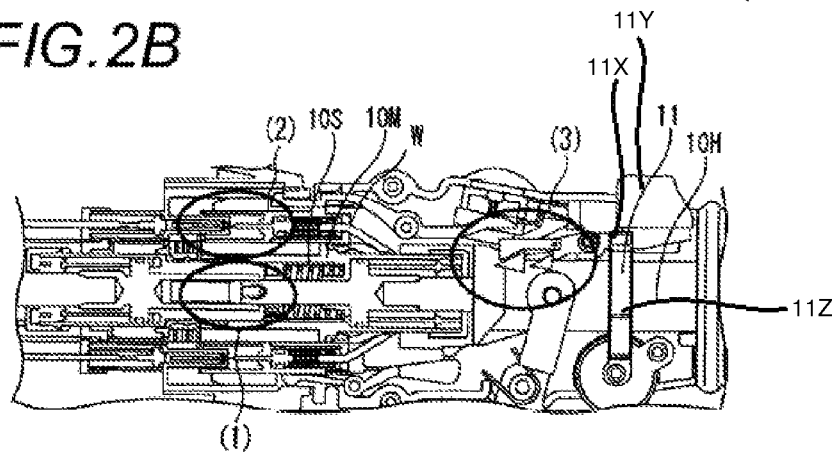
FIG. 2B is an enlarged vertical cross sectional view of a portion in the vicinity of a connector body shown in FIG. 2A, and FIGS. 2C to 2E are enlarged views respectively showing encircled portions in FIG. 2B.
Figure 2C:
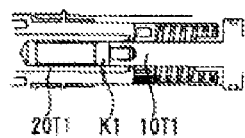
Figure 2D:
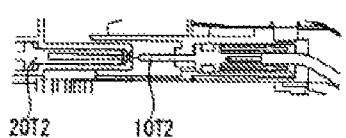

The connector body 10M (shown in FIGS. 2A and 2B) is configured to accommodate a plurality of power terminals 10T1 (shown in FIG. 2C) and a plurality of signal terminals 10T2 (shown in FIG. 2D). The connector body 10M is accommodated in the front half part of the cylindrical case 10C so as to be slidable. The connector body 10M is always urged in the backward direction (in the anti-fitting direction) by a repulsive force of a coil spring 10S (shown in FIG. 2B). By pushing a rear end of the connector body 10M against the repulsive force of the coil spring 10S by means of the handle 10H, the connector body 10M advances in the cylindrical case 10C in the fitting direction.

[Lever 10L]

The intermediate portion of the lever 10L is pivotally attached to the rear part of the cylindrical case 10C by the lever shaft 10P1 (shown in FIG. 1A) and the tip portion of the lever 10L is pivotally supported by the pin 10P2 (shown in FIGS. 1A and 1B) inserted into the long cave hole of the cylindrical case 10C together with a shaft hole of the handle 10H.

[Handle 10H]

The handle 10H is formed in a substantially L shaped tubular long body. A plurality of thick and thin electric wire cables W (shown in FIG. 2B) are inserted in the handle 10H, and the tip portions of the electric wire cables W are respectively connected to the power terminals 10T1 (shown in FIG. 2C) and the signal terminals 10T2 (shown in FIG. 2D).

The handle 10H is pivotally supported on the cylindrical case 10 C together with the tip portion of the lever 10L by a pin 10P2 (shown in FIGS. 1A and 1B) inserted into the long cave hole at the rear half part of the cylindrical case 10C.

Therefore, when the lever 10L is gripped up toward the handle 10H, a tip portion of an action portion 10W (shown in FIG. 1B) of the lever 10L is rotated in the counterclockwise direction centering around the lever shaft 10P1 so as to cause the handle 10H to advance, the advancing handle 10H pushes the rear end of the connector body 10M, and thereby the connector body 10M is moved forward in the cylindrical case 10C against the repulsion force of the coil spring 10S so as to be fitted with a mating connector (a power reception side connector).

[Feature 1: Complete Latch Piece 10A and Provisional Latch Piece 10B of Handle 10H]

In accordance with the invention, a complete latch piece 10A and a provisional latch piece 10B are provided on the handle 10H at a side face thereof as described below. That is, the invention features that the complete latch piece 10A and the provisional latch piece 10B formed of triangle members are provided on the side face of the handle 10H such that they can be respectively engaged with a provisional latch pawl BK of a provisional latch arm 11B and a complete latch pawl AK of a complete latch arm 11A of a release lever 11 (shown in FIG. 1B, described later) under a condition that the provisional latch pawl BK and the complete latch pawl AK are stopped.

[Release Lever 11]

While the connector body 10M and the mating connector become in a fitted state when the lever 10L is gripped up, the release lever 11 (shown in FIG. 1B) is adapted to block the returning of the lever 10L from the fitted state after that. The release lever 11 is formed in a roughly T-shape by an action arm 11X (Shown in FIG. 2B) extending in the axial direction of the connector body 10M, an operation arm 11Y (Shown in FIG. 2B) protruding to the rear outside of the cylindrical case 10C and a lock arm 11Z (Shown in FIG. 2B) extending from an intermediate portion between both of the arms toward a portion just beneath the intermediate portion. The intermediate portion of the arms is rotatably supported by a pin attached to the cylindrical case 10C at a portion above the handle 10H.

[Action Arm 11X]

In accordance with the invention, the provisional latch arm 11B is rotatably attached to the action arm 11X at its tip portion, and a complete latch arm 11A is rotatably attached to the provisional latch arm 11B at the tip portion thereof (described later).

[Operation Arm 11Y]

The operation arm 11Y protrudes to the outside from the rear part of the cylindrical case 100. When the operation arm 11Y is pushed down, the action arm 11X of the release lever 11 is rotated, and thereby the provisional latch arm 11B and the complete latch arm 11A are released from a locked state with the handle 10H.

[Lock Arm 11Z]

The lock arm 11Z has a lock hole at its lower end portion, and an electromagnetic coil having a plunger facing the lock hole and a coil spring, is fixed to the lock arm 11Z at a cylindrical case 100 side. With this, when the electromagnetic coil is excited by the complete fitting between the power supply side connector and the power reception side connector, the plunger is elongated and is moved into the lock hole so as to lock the release lever 11. In addition, when the electromagnetic coil is demagnetized at the same time of completion of charging, the plunger is instantly moved backward by a resilient force of the coil spring so as to release the locked state. Therefore, even when a user is erroneously going to push down the operation arm 11Y of the release lever 11 so as to release the locked state during the charging of power, the lever is maintained in the locked state by the plunger of the electromagnetic coil, so that the disconnection during the supplying of power can be surely prevented.

[Feature 2: Complete Latch Arm 11A and Provisional Latch Arm 11B Provided on Release Lever]

Figure 1B:
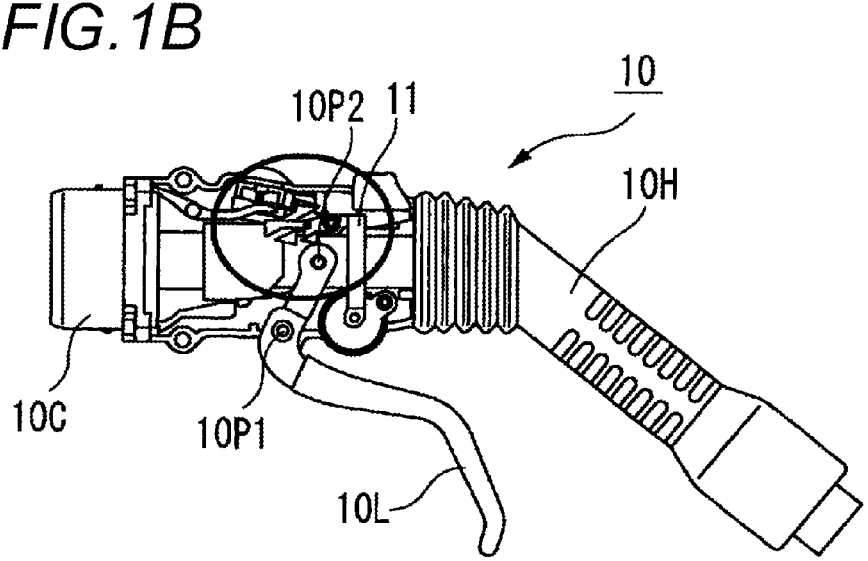
FIG. 1B is an enlarged view showing an encircled portion in FIG. 1A.

As described above, the provisional latch arm 11B is attached to the tip portion of the action arm 11X of the release lever 11 so as to be rotatable centering around the pin 11P2 (shown in FIG. 1B), and the complete latch arm 11A is attached to the tip portion of the provisional latch arm 11B so as to be rotatable centering around the pin 11P1 (shown in FIG. 1B). The invention features that the complete latch pawl AK and the provisional latch pawl BK each facing downward are respectively formed at the tip portions of the complete latch arm 11A and the provisional latch arm 11B. The complete latch arm 11A and the provisional latch arm 11B are always urged downward (in the drawing) by the coil spring provided on the inner wall of the case 10C. Regarding the provisional latch piece 10B and the complete latch piece 10A provided on the side face of the handle 10H, in association with the advancing of the handle 10H, the provisional latch piece 10B is first engaged with the provisional latch pawl BK of the provisional latch arm 11B. When the handle 10H further advances, the complete latch piece 10A is engaged with the complete latch pawl AK of the complete latch arm 11A. In accordance with the above operations, the locking can be performed by one action of a normal operation the same as the conventional one that the lever 10L is gripped toward the handle 10H. The operability is not particularly deteriorated by the complete latch arm 11A and the provisional latch arm 11B provided on the action arm 11X.

[Feature 3: Setting of Time Difference Between Power Terminal 10T1 and Signal Terminal 10T2]

The power terminals 10T1 (shown in FIG. 2C) in which a charge current (a large current) flows and the signal terminals 10T2 (shown in FIG. 2D) in which a control signal and the like (a small current) flows, are provided in the connector body 10M. The invention features that a time difference is provided between connection of the power terminals 10T1 to the power terminals 20T1 (shown in FIG. 2C) of the mating connector and connection of the signal terminals 10T2 to the signal terminals 20T2 (shown in FIG. 2D) of the mating connector. That is, in the initial state (the connectors are not yet fitted with each other), the power terminals 10T1 and the signal terminals 10T2 are respectively in non-connected states. However, the time difference is set in such a manner that in a case where the connectors are in the provisional fitted state, the power terminals 10T1 are, as shown in FIG. 2, connected to the power terminals 20T1 (shown in FIG. 2C), and the signal terminals 10T2 are not connected to the signal terminals 20T2 (shown in FIG. 2D). When the connectors are made in the completely fitted state, the power terminals 10T1 and the signal terminals 10T2 are in the connected states, respectively as shown in FIGS. 3C and 3D.

The above setting can be achieved in such a manner that positions of the power terminals 10T1 and the signal terminals 10T2 in the connector body 10M are deviated by a distance of approximately several mm so as to make the power terminals 10T1 to be positioned prior to the signal terminals 10T2 by the distance of approximately several mm.

[Fitting Operation of Connectors]

Next, a fitting operation of the connectors of the invention is described by returning to FIG. 1.

[In the Non-Fitted State (Initial State) of Power Supply Connector]

As shown in FIG. 1, since the lever 10L is not yet gripped, the tip portion of the lever 10L is not yet rotated and the handle 10H is in a retracted state as in the non-fitted state (the initial state). Therefore, since a state is maintained in which the connector body 10M is accommodated in the cylindrical case 10C, the connector body 10M is invisible in the drawing (caution: since FIG. 2A shows the half fitted state, the tip portion of the connector body 10M is slightly visible).

Consequently, the provisional latch piece 10B and the complete latch piece 10A provided on the side face of the handle 10H are respectively placed at the rear sides of the provisional latch pawl BK of the provisional latch arm 11B and the complete latch pawl AK of the complete latch arm 11A, and thereby they are not in the engaged states, respectively.

[In the Half Fitted State of Power Supply Connector]

Figure 2E:
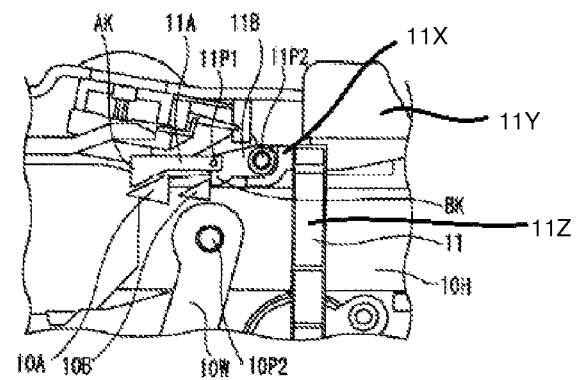

When the lever 10L is gripped up, the connectors become in the half fitted state shown in FIGS. 2A-2E, the tip portion of the lever 10L is rotated so as to cause the handle H to advance, and thereby the tip portion of the connector body 10M is slightly exposed from the cylindrical case 10C. At that time, the provisional latch piece 10B provided on the side face of the handle 10H is engaged with the provisional latch pawl BK of the provisional latch arm 11B of the release lever 11 as shown in FIG. 2E. In the above state, the power terminals 10T1 is connected to the counter side power terminals 20T1 as shown in FIG. 2C, but the signal terminals 10T2 are not connected to the counter side signal terminals 20T2 as shown in FIG. 2D.

[In the Completely Fitted State of Power Supply Connector]

When the lever 10L is further gripped up, the connectors become in the completely fitted state as shown in FIG. 3, the tip portion of the lever 10L is further rotated so as to cause the handle 10H to further advance, the tip portion of the connector body 10M is markedly exposed from the cylindrical case 10C, and thereby the supply side connector is completely fitted with the mating connector (in the completely fitted state).

Figure 3A:
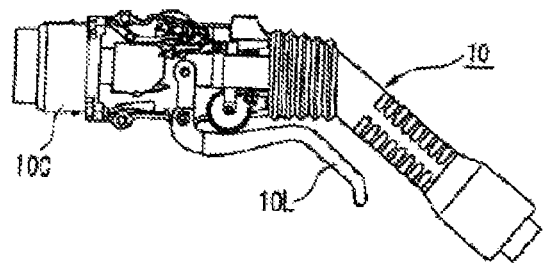
FIG. 3A is an elevational view showing a completely fitted state of the arc discharge prevention connector according to the invention.
Figure 3B:
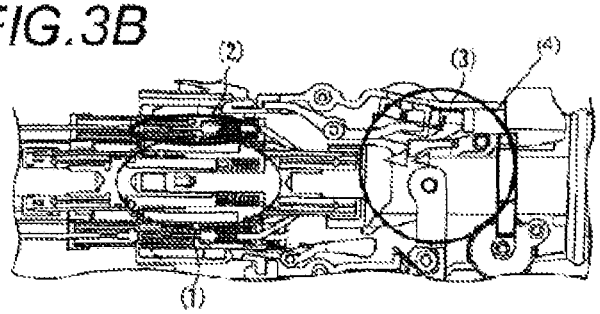
FIG. 3B is an enlarged vertical cross sectional view of a portion in the vicinity of the connector body shown in FIG. 3A, FIGS. 3C to 3E are enlarged views respectively showing encircled portions in FIG. 3B.
Figure 3C:
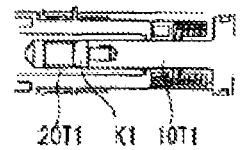
Figure 3D:
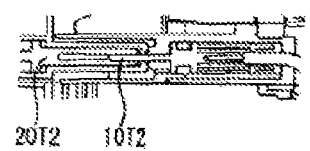
Figure 3E:
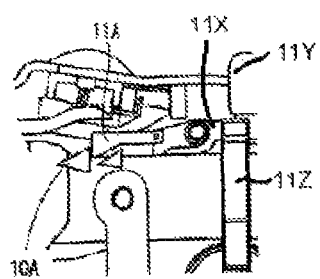
FIG. 3E is a schematic view showing a complete engaged state.

At that time, since the handle 10H advances, the provisional latch piece 10B of the handle 10H is separated from the provisional latch pawl BK of the provisional latch arm 11B with which the provisional latch piece 10B has been engaged. Next, the complete latch piece 10A is engaged with the complete latch pawl AK of the complete latch arm 11A as shown in FIG. 3A and FIG. 3E. In the above state, the power terminals 10T1 are brought into intimate contact with the counter side power terminals 20T1 as shown in FIG. 3C, and the signal terminals 10T2 break into the counter side signal terminals 20T2 as shown in FIG. 3D so as to be electrically connected thereto.

[Reason why Arc Discharge does not Occur in Incomplete Engagement on Completely Latched Position]

Figure 3F:
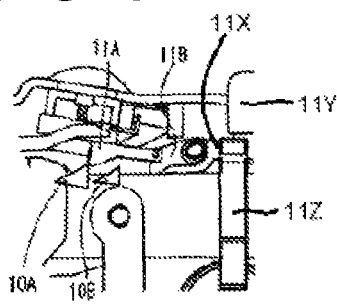
Figure 4:
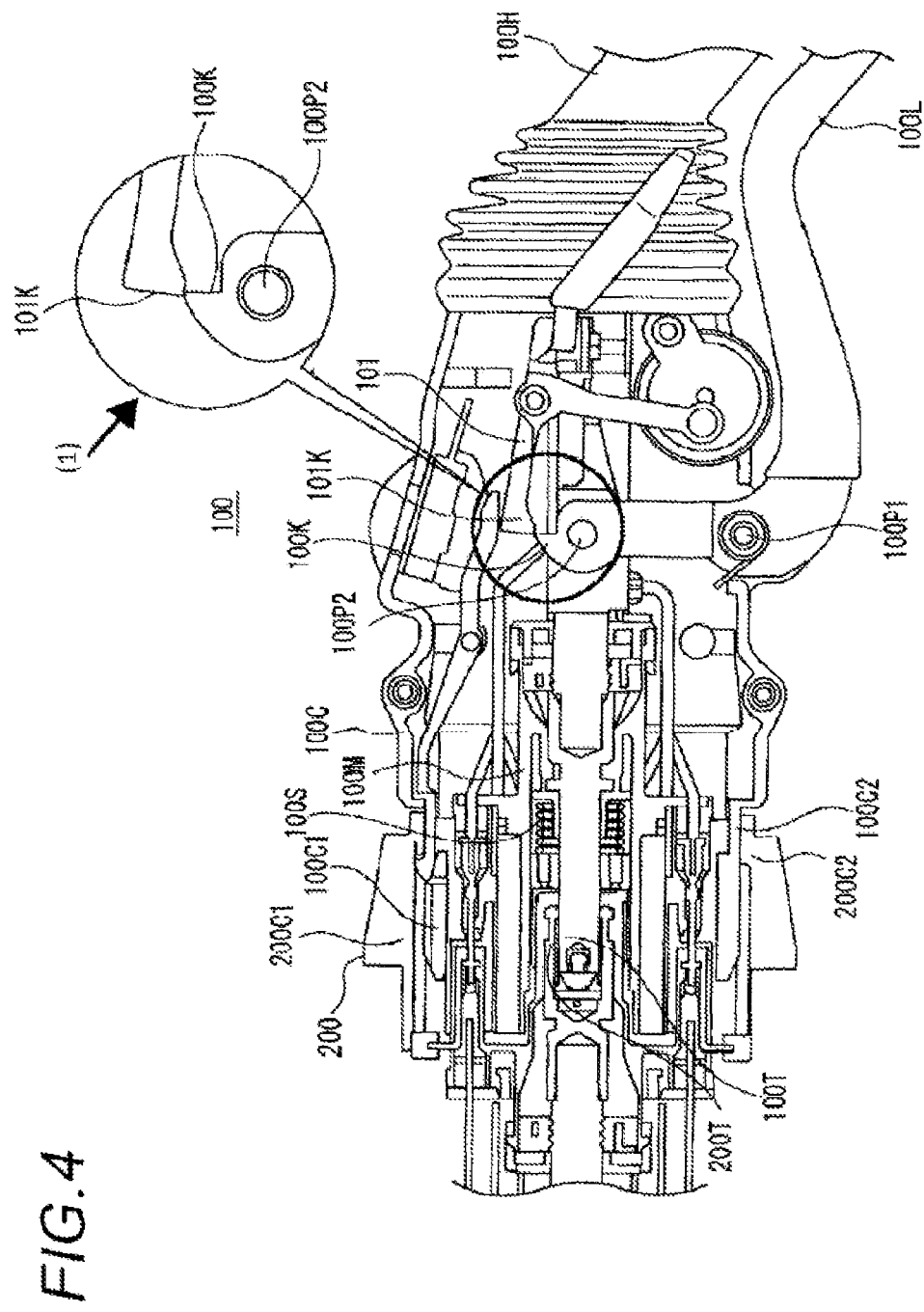
FIG. 4 is an elevational view showing a connector with a handle described in PTL 1.

In a case where the complete latch arm 11A and the complete latch piece 10A are in an incomplete engaged state on the completely latched position as shown in FIG. 3F, since the power terminals and the signal terminals are respectively in the connected states, the charge current is flowing in the power terminals. When an impact is applied to the connectors, the complete latch arm 11A and the complete latch piece 10A may be released from the engagement because of the incomplete engaged state. With this, the handle 10H is immediately moved backward by the urging force of the coil spring 10S, the latch piece 10B just near the complete latch piece 10A is engaged with the provisional latch arm 11B so as to stop the backward movement of the handle 10H to make it in a provisional latched state. On the provisional latching position, the signal terminals 10T2 are disconnected, but the power terminals 10T1 are still in the contact state so that arc discharge does not occur. Therefore, when the disconnection of the signal terminals 10T2 is detected in the above state and the charge circuit stops the energizing to the power terminals 10T1, safe removing or refitting can be carried out. Contrary to the above, since a related art device does not have such a provisional latched state, connectors are suddenly disconnected from each other when unexpected disconnection occurs by a reactive force of a lever and a time period from disconnection of signal terminals to disconnection of power terminals is short, thereby arc discharge may occur at that time.

[Overview]

In accordance with the invention, even in a case where interference abrasion occurs between both of the connector housings during a fitting operation of the connector with the mating connector in the event of gripping of the lever, the lever is stopped so as to start the charging under a condition that the lever is not gripped up on the completely latched position (incomplete engaged state), and after that an impact is applied in the above condition so as to cause the connectors to be released from the incomplete engaged state, the handle is moved backward from the completely latched position and is locked on the provisional latching position nearest to the completely latched position. On the provisional latching position, the signal terminals are disconnected, but the power terminals are still in the contact state so that arc discharge does not occur. With this, since the disconnection of the signal terminals is detected in the above state and the charge circuit stops the energizing to the power terminals, safe removing or refitting can be carried out. Meanwhile, the embodiment has a structure in which the handle is moved backward or forward in the case, but the invention is not limited thereto. The invention can be applied to a structure in which the handle is not moved backward or forward in the case. In the above case, the provisional latch piece and the complete latch piece can be provided on the connector body.

The present application is based on Japanese Patent Application No. 2011-113931 filed on May 20, 2011, the contents of which are incorporated herein by reference.

Industrial Applicability

By the above configuration of the present disclosure, an arc discharge prevention connector that prevents arc discharge from occurring on power terminals can be obtained.

Reference Signs List 10 arc discharge prevention connector
    10C cylindrical case
    10H handle
    10L lever
    10A complete latch piece
    10B provisional latch piece
    10M connector body
    10P1 lever shaft
    10P2 pin
    10S coil spring
    10T1 power terminal
    10T2 signal terminal
    10W active section
    11 release lever
    11A complete latch arm
    11B provisional latch arm
    11X action arm
    11Y operation arm
    11Z lock arm
    AK complete latch pawl
    BK provisional latch pawl
    W electric wire cable

The invention claimed is:

1. An arc discharge prevention connector, comprising:
a cylindrical case;
a connector body that is slidably accommodated in a front half part of the cylindrical case and has a power terminal and a signal terminal,
a lever rotatably attached to the cylindrical case;
a handle; and
a release lever that prevents a returning operation of the lever in a state that the connector body is fitted with a mating connector by a rotational operation of the lever,
wherein the connector body is moved in the cylindrical case in accordance with the rotational operation of the lever;
wherein the release lever has an action arm extending in an axial direction of the connector body, a provisional latch arm provided on a tip portion of the action arm, and a complete latch arm provided on a tip portion of the provisional latch arm;
wherein a provisional latch piece which is engaged with the provisional latch arm at a half fitted position of the connector body and a complete latch piece which is engaged with the complete latch arm at a completely fitted position of the connector body are provided on either one of the handle and the connector body; and
wherein in a state that the provisional latch arm is engaged with the provisional latch piece, the power terminal is in contact with a power terminal of the mating connector and the signal terminal is in non-contact with a signal terminal of the mating connector.

2. The arc discharge prevention connector according to claim 1, wherein the provisional latch arm is rotatably provided on the tip portion of the action arm via a pin therebetween, the complete latch arm is rotatably provided on the tip portion of the provisional latch arm via a pin therebetween.

3. The arc discharge prevention connector according to claim 1, wherein dimensions of the power terminal and the signal terminal are set to be differentiated so that the power terminal is brought into contact with the power terminal of the mating connector prior to a timing the signal terminal is brought into contact with the signal terminal of the mating connector.

4. An arc discharge prevention connector, comprising:
a case;
a connector body that is slidably accommodated in a front portion of the case and comprising a power terminal and a signal terminal,
a lever rotatably attached to the case;
a handle; and
a release lever comprising an action arm, a provisional latch arm provided on a tip portion of the action arm, and a complete latch arm provided on a tip portion of the provisional latch arm,
wherein the connector body is configured to be moved within the case in accordance with the rotational operation of the lever,
wherein one of the handle and the connector body comprises a provisional latch piece configured to be engaged with the provisional latch arm at a half fitted position of the connector body and a complete latch piece configured to be engaged with the complete latch arm at a completely fitted position of the connector body, and
wherein, in a state that the provisional latch arm is engaged with the provisional latch piece, the power terminal is in contact with a power terminal of a mating connector and the signal terminal is in non-contact with a signal terminal of the mating connector.

5. The arc discharge prevention connector according to claim 4, wherein dimensions of the power terminal and the signal terminal are set so that the power terminal is brought into contact with the power terminal of the mating connector prior to a timing of the signal terminal being brought into contact with the signal terminal of the mating connector.

6. The arc discharge prevention connector according to claim 4, wherein, in a state that the complete latch arm is engaged with the complete latch piece, the power terminal is in contact with the power terminal of the mating connector and the signal terminal is in contact with the signal terminal of the mating connector.

* * * * *